United States Patent
Lee

(10) Patent No.: US 6,584,918 B2
(45) Date of Patent: Jul. 1, 2003

(54) DESK WITH A LEG-AND-STRETCHER COUPLING UNIT

(75) Inventor: Alex Lee, Taipei (TW)

(73) Assignee: Project Systems Furniture Co., Ltd., Taipei (TW)

( * ) Notice: Subject to any disclaimer, the term of this patent is extended or adjusted under 35 U.S.C. 154(b) by 0 days.

(21) Appl. No.: 10/024,813

(22) Filed: Dec. 18, 2001

(65) Prior Publication Data

US 2002/0101138 A1 Aug. 1, 2002

(30) Foreign Application Priority Data

Dec. 19, 2000 (TW) ..................................... 89222029 U

(51) Int. Cl.[7] .............................................. A47B 47/00
(52) U.S. Cl. ............. 108/155; 108/158.11; 108/158.13; 403/381
(58) Field of Search .............................. 108/153.1, 154, 108/155, 158.11, 158.12, 158.13; 403/3, 381, 355; 52/738

(56) References Cited

U.S. PATENT DOCUMENTS 3,747,885 A  7/1973 Ciancimino
4,941,763 A * 7/1990 Euteneuer ...................... 403/3
5,095,677 A  3/1992 Godbout et al.
5,899,423 A * 5/1999 Albertini .................. 108/50.11

FOREIGN PATENT DOCUMENTS

| DE | 20008105 | 9/2000 |
| EP | 0 830 825 A3 | 3/1998 |
| EP | 0 830 825 A2 | 3/1998 |
| JP | 2001-37562 | 2/2001 |

* cited by examiner

Primary Examiner—Lanna Mai
Assistant Examiner—Jerry A. Anderson
(74) Attorney, Agent, or Firm—Akin, Gump, Strauss, Hauer & Feld, L.L.P.

(57) ABSTRACT

A desk includes a desk top, a plurality of legs, a plurality of stretchers, and a coupling unit including a plurality of first and second linkages. Each of the first linkages includes a cylindrical part formed with a plurality of alternately disposed first engaging grooves and engaging ridges. Each of the engaging ridges is defined by a ridge-confining wall that has a C-shaped cross-section. Each of the second linkages is in the form of a clamp that has two opposing clamp arms. The clamp arms have two opposing curved ends which are inserted into two adjacent ones of the first engaging grooves, and which have inner faces substantially conform to and abut tightly against the ridge-confining wall of a respective one of the engaging ridges so as to secure the stretchers to the legs.

2 Claims, 3 Drawing Sheets

DESK WITH A LEG-AND-STRETCHER COUPLING UNIT

CROSS-REFERENCE TO RELATED APPLICATION

This application claims priority of Taiwan patent Application No. 89222029, filed on Dec. 19, 2000.

BACKGROUND OF THE INVENTION

1. Field of the Invention

This invention relates to a desk with a leg-and-stretcher coupling unit, more particularly to a desk with a leg-and-stretcher coupling unit that permits adjustment of an angle between two interconnected stretchers of the desk.

2. Description of the Related Art

A conventional desk normally includes a desk top, a plurality of legs, and a plurality of stretchers interconnecting the legs. The conventional desk is disadvantageous in that the relative positions among the legs are fixed. As a consequence, the legs cannot be adjusted so as to suit a desired spacing that does not conform to the geometric dimensions of the desk.

SUMMARY OF THE INVENTION

Therefore, the object of the present invention is to provide a desk with a coupling unit that is capable of overcoming the aforementioned drawback of the prior art.

According to the present invention, a desk comprises: a desk top; a plurality of legs for supporting the desk top, each of the legs extending in a longitudinal direction; a plurality of stretchers, each extending between and having two opposite ends connected to two adjacent ones of the legs; and a coupling unit including a plurality of first linkages, each of which is detachably mounted on a respective one of the legs, each of which defines a centerline in the longitudinal direction, and each of which includes a plurality of angularly spaced apart first engaging members around the centerline. The coupling unit further includes a plurality of second linkages, each of which is secured to and extends from a respective one of the opposite ends of a respective one of the stretchers, and each of which includes a second engaging member that selectively engages one of the first engaging members so as to permit adjustment of an angle between two interconnected ones of the stretchers. Each of the first linkages includes a cylindrical part that defines the centerline, and that is formed with a plurality of alternately disposed first engaging grooves and engaging ridges which extend in the longitudinal direction. Each of the engaging ridges defines a respective one of the first engaging members and is defined by a ridge-confining wall that has a C-shaped cross-section. Each of the second linkages is in the form of a clamp that has two opposing clamp arms. The clamp arms have two opposing curved ends which define a respective one of the second engaging members, which are inserted into two adjacent ones of the first engaging grooves, and which have inner faces that substantially conform to and that abut tightly against the ridge-confining wall of a respective one of the engaging ridges so as to secure the stretchers to the legs.

BRIEF DESCRIPTION OF THE DRAWINGS

In drawings which illustrate an embodiment of the invention.

DETAILED DESCRIPTION OF THE PREFERRED EMBODIMENT

Figure 1:
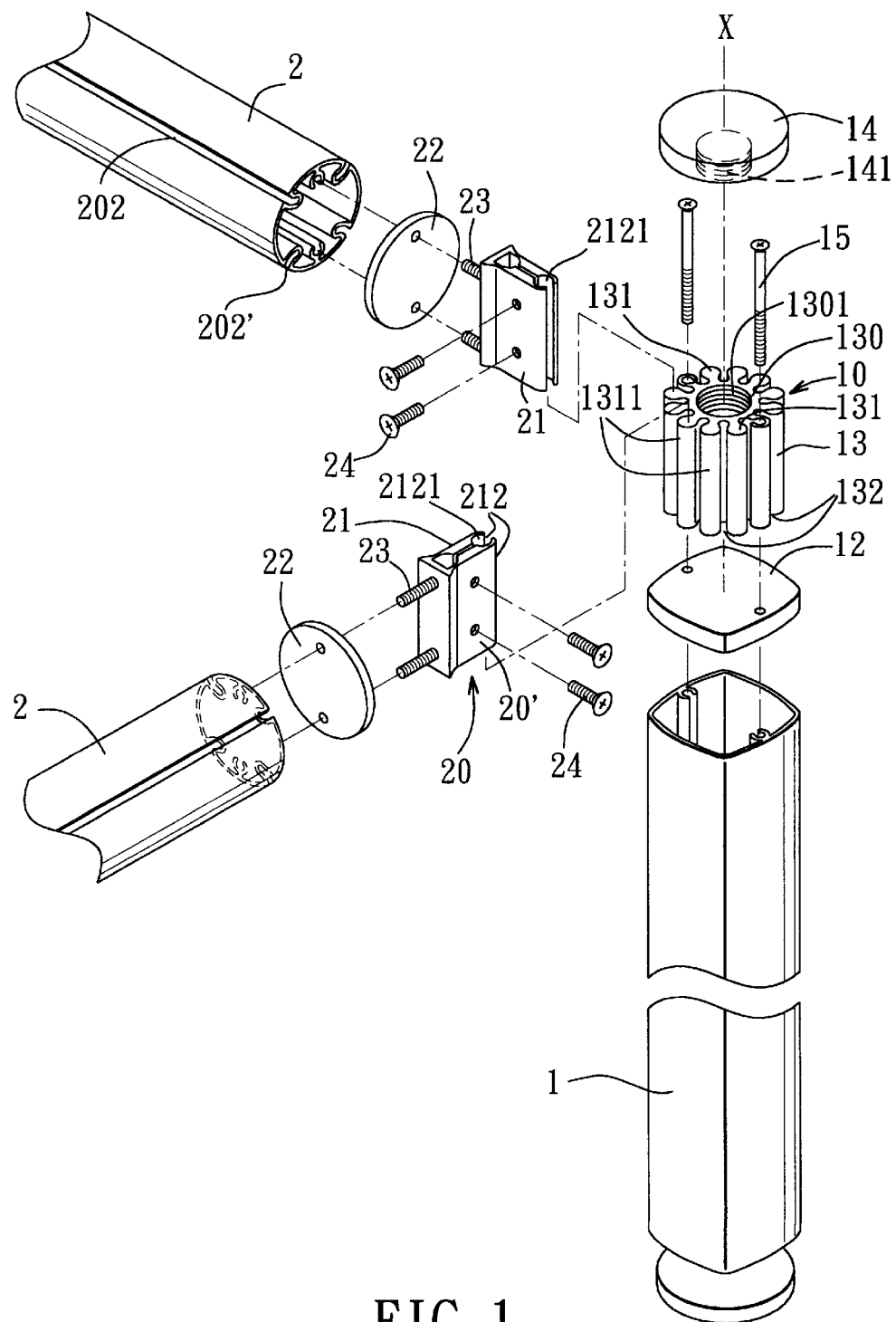
FIG. 1 is an exploded perspective view of a leg-and-stretcher coupling unit of a preferred embodiment of a desk of this invention, illustrating two stretchers and a leg coupled thereto.

FIGS. 1 to 4 illustrate a preferred embodiment of a desk of this invention that includes: a desk top 3 (see FIG. 3); a plurality of legs 1 (only one is shown) for supporting the desk top 3, each of the legs 1 extending in a longitudinal direction; a plurality of stretchers 2, each extending between and having two opposite ends connected to two adjacent ones of the legs 1; and a coupling unit including a plurality of first linkages 10 (only one is shown), each of which is detachably mounted on a top of a respective one of the legs 1 via a fastening plate 12 and screw means 15, each of which defines a centerline (X) in the longitudinal direction, and each of which includes a plurality of angularly spaced apart first engaging members 13 around the centerline (X). The coupling unit further includes a plurality of second linkages 20 (only one is shown), each of which is secured to and extends from a respective one of the opposite ends of a respective one of the stretchers 2, and each of which includes a second engaging member 20' that selectively engages one of the first engaging members 13 so as to permit adjustment of an angle between two interconnected ones of the stretchers 2. Each of the first linkages 10 includes a hollow cylindrical part 130 that defines the centerline (X), and that is formed with an inner threaded face 1301, and a plurality of alternately disposed engaging ridges 131 and engaging grooves 132 which extend in the longitudinal direction. Each of the engaging ridges 131 defines a respective one of the first engaging members 13 and is defined by a ridge-confining wall 1311 that has a C-shaped cross-section. Each of the second linkages 20 is secured to the respective one of the stretchers 2 via screw means 23, and is in the form of a clamp that has two opposing clamp arms 21. The clamp arms 21 define a gap therebetween, and have two opposing curved ends 212 which define a respective one of the second engaging members 20', which are inserted into two adjacent ones of the first engaging grooves 132, and which have inner faces 2121 that substantially conform to and that abut tightly against the ridge-confining wall 1311 of a respective one of the engaging ridges 131 so as to secure the stretchers 2 to the legs 1. Preferably, the clamp arms 21 are provided with screw means 24 so as to permit adjustment of the width of the gap and so as to fasten the stretchers 2 to the legs 1. A top cover 14 covers a top end of the cylindrical part 130 of the first linkage 10, and includes a central male threaded part 141 that projects into and that threadedly engages the inner threaded face 1301 of the cylindrical part 130. A stretcher cover 22 is provided to cover each of the opposite ends of each of the stretchers 2.

Figure 2:
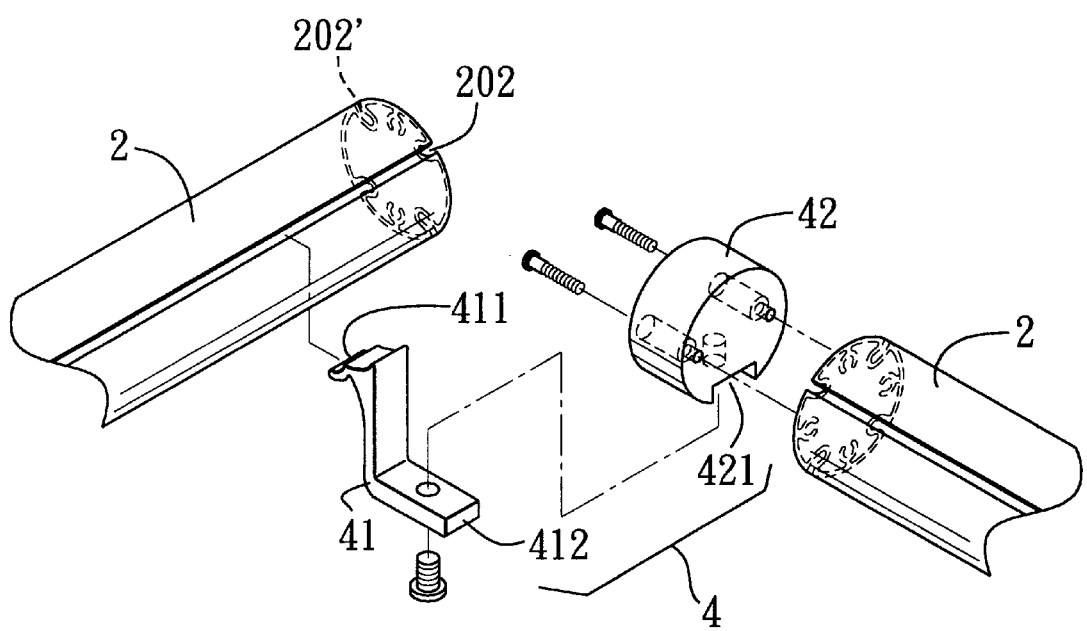
FIG. 2 is an exploded perspective view of a first connecting member of the desk of the preferred embodiment, illustrating two stretchers coupled thereto.

Referring to FIG. 2, each of the stretchers 2 is in the form of a cylindrical body that extends in a transverse direction relative to a respective one of the legs 1, and that is formed with a plurality of angularly spaced apart third engaging members (202, 202'), each of which includes alternately disposed second and third engaging grooves 202, 202' extending in the transverse direction from one of the opposite ends of the stretcher 2 to the other one of the opposite ends of the stretcher 2. A plurality of first connecting members 4 (only one is shown) is provided for coupling respective ones of the stretchers 2. Each of the first connecting members 4 includes a cylindrical block 42 that is secured to one of the opposite ends of a respective one of the stretchers 2 and that is formed with a retaining notch 421 extending in the transverse direction, and an L-shaped plate 41 that has one end 412 received in the retaining notch 421 and secured to the cylindrical block 42, and a protrusion 411 projecting from the other end thereof in the transverse direction and inserted snuggly into one of the second engaging grooves 202 of an adjacent one of the stretchers 2.

Figure 3:
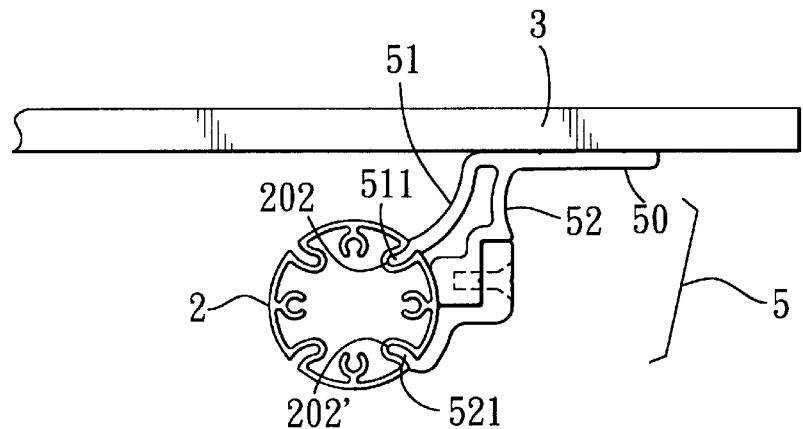
FIG. 3 is a side view of a second connecting member of the desk of the preferred embodiment, illustrating a desk top and a stretcher coupled thereto.

Referring to FIG. 3, a plurality of second connecting members 5 (only one is shown) is provided for coupling the stretchers 2 to the desk top 3. Each of the second connecting members 5 includes a mounting plate 50 secured to a bottom side of the desk top 3, and a fourth engaging member that engages one of the third engaging members (202, 202') and that includes a pair of spaced apart tongues (511, 521) connected to two spaced apart extensions (51, 52) of the mounting plate 50 and inserted snuggly and respectively into the second and third engaging grooves (202, 202') of one of the third engaging members (202, 202') so as to secure the stretchers 2 to the desk top 3. The second and third engaging grooves (202, 202') of each of the third engaging members (202, 202') of each of the stretchers 2 extend curvedly and inwardly of the stretcher 2 toward each other so as to enhance securing of the stretchers 2 to the desk top 3.

Figure 4:
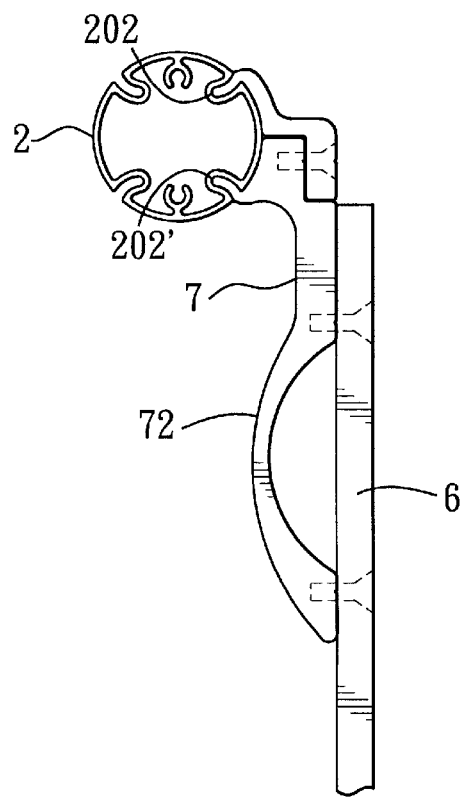
FIG. 4 is a side view of a third connecting member of the desk of the preferred embodiment, illustrating a frieze and a stretcher coupled thereto.

Referring to FIG. 4, a plurality of third connecting members 7 (only one is shown) is provided for coupling the stretchers 2 to a frieze of the desk. Each of the third connecting members 7 has a configuration similar to that of the second connecting members 5, except that the mounting plate 72 thereof has a curved section.

With the invention thus explained, it is apparent that various modifications and variations can be made without departing from the spirit of the present invention. It is therefore intended that the invention be limited only as recited in the appended claims.

I claim:

1. A desk, comprising:

a plurality of legs, each extending in a longitudinal direction;

a plurality of stretchers, each extending between and having two opposite ends connected to two adjacent ones of said legs;

a coupling unit including a plurality of first linkages, each of which is detachably mounted on a respective one of said legs, each of which defines a centerline in said longitudinal direction, and each of which includes a plurality of angularly spaced apart first engaging members around said centerline, said coupling unit further including a plurality of second linkages, each of which is secured to and extends from a respective one of said opposite ends of a respective one of said stretchers, and each of which includes a second engaging member that selectively engages one of said first engaging members so as to permit adjustment of an angle between two interconnected ones of said stretchers, each of said first linkages including a cylindrical part that defines said centerline, and that is formed with a plurality of alternately disposed first engaging grooves and engaging ridges which extend in said longitudinal direction, each of said engaging ridges defining a respective one of said first engaging members and being defined by a ridge-confining wall that has a C-shaped cross-section, each of said second linkages being in the form of a clamp that has two opposing clamp arms, said clamp arms having two opposing curved ends which define a respective one of said second engaging members, which are inserted into two adjacent ones of said first engaging grooves, and which have inner faces that substantially conform to and that abut tightly against said ridge-confining wall of a respective one of said engaging ridges so as to secure said stretchers to said legs; and a plurality of connecting members, each of which includes a cylindrical block that is secured to one of said opposite ends of a respective one of said stretchers and that is formed with a retaining notch extending in said transverse direction, and an L-shaped plate that has one end received in said retaining notch and secured to said cylindrical block, and an opposite end opposite said end, each of said stretchers being in the form of a cylindrical body that extends in a transverse direction relative to a respective one of said legs, and that is formed with a plurality of angularly spaced apart second engaging grooves extending in said transverse direction from one of said opposite ends of said stretcher to the other one of said opposite ends of said stretcher, said L-shaped plate being formed with a protrusion projecting from said opposite end in said transverse direction and inserted snuggly into one of said second engaging grooves of an adjacent one of said stretchers.

2. The desk of claim 1, further comprising a desk top having a bottom side mounted on said legs, said cylindrical body of each of said stretchers being further formed with a plurality of third engaging grooves extending in said transverse direction from one of said opposite ends of said stretcher to the other one of said opposite ends of said stretcher, said second and third engaging grooves being alternately displaced from one another, said desk further comprising a plurality of connecting members, each of which includes a mounting plate secured to said bottom side of said desk top, and a pair of spaced apart tongues connected to said mounting plate and inserted snuggly and respectively into an adjacent pair of said second and third engaging grooves in said cylindrical body of an adjacent one of said stretchers so as to secure said stretchers to said desk top.

* * * * *